(12) United States Patent
Wang et al.

(10) Patent No.: US 9,954,425 B2
(45) Date of Patent: Apr. 24, 2018

(54) LINEAR VIBRATING MOTOR

(71) Applicants: HongXing Wang, Shenzhen (CN); LuBin Mao, Shenzhen (CN); Fei Hou, Shenzhen (CN)

(72) Inventors: HongXing Wang, Shenzhen (CN); LuBin Mao, Shenzhen (CN); Fei Hou, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 249 days.

(21) Appl. No.: 15/082,089

(22) Filed: Mar. 28, 2016

(65) Prior Publication Data

US 2017/0019011 A1 Jan. 19, 2017

(30) Foreign Application Priority Data

Jul. 17, 2015 (CN) ...................... 2015 2 0524856 U

(51) Int. Cl.
*H02K 33/00* (2006.01)
*H02K 5/24* (2006.01)
*H02K 5/04* (2006.01)
*H02K 33/16* (2006.01)

(52) U.S. Cl.
CPC .................................... *H02K 33/16* (2013.01)

(58) Field of Classification Search
CPC ................................ H02K 33/00; H02K 5/24
USPC .................................... 310/15, 25, 36, 51, 81
See application file for complete search history.

(56) References Cited

U.S. PATENT DOCUMENTS

| 2011/0018365 A1* | 1/2011 | Kim | B06B 1/045 310/17 |
|---|---|---|---|
| 2011/0203061 A1* | 8/2011 | Takahashi | A61C 17/32 15/22.1 |
| 2012/0104875 A1* | 5/2012 | Park | H02K 33/16 310/25 |
| 2013/0313919 A1* | 11/2013 | Nakamura | H02K 33/00 310/25 |

* cited by examiner

*Primary Examiner* — Jose Gonzalez Quinones
(74) *Attorney, Agent, or Firm* — Na Xu; IPro, PLLC

(57) ABSTRACT

A linear vibrating motor is provided in the present disclosure. The linear vibrating motor includes a shell, a vibrating module, a coil module and an elastic module. The shell provides a receiving cavity; the vibrating module is received in the receiving cavity for generating a linear vibration; the coil module is configured for driving the vibrating module to vibrate. The elastic module is configured for suspending the vibrating module in the receiving cavity, and includes a first elastic member, a second elastic member and a third elastic member connected between the vibrating module and the shell at a first connecting point, a second connecting point and a third connected point, the first connecting point, the second connecting point and the third connecting point are arranged in a non-linear manner.

15 Claims, 5 Drawing Sheets

LINEAR VIBRATING MOTOR

FIELD OF THE DISCLOSURE

The present disclosure generally relates to vibrator technologies, and more particularly, to a linear vibrating motor for providing vibration feedback.

BACKGROUND

Vibrating motors are widely used in mobile devices such as mobile phones, tablet computer, handheld game players, personal digital assistant, or the like, for providing vibration feedback. In operation, the vibrating motors transform electrical energy into mechanical energy based on electromagnetic induction.

Generally, the vibrating motors can be categorized into rotary vibrating motors and linear vibrating motors. The rotary vibrating motor generates vibrations by driving an unbalanced rotor to rotate. The linear vibrating motor generates vibrations by providing an electromagnetic force to drive a vibrator to perform linear mechanical vibration.

A typical linear vibrating motor includes a magnet module and an elastic module. The elastic module is a pair of spiral springs, and the magnet module is suspended in the vibrating motor by the pair of spiral springs. The magnet module is driven to perform linear vibration when the vibrating motor is in operation.

However, in the linear vibrating motor, the spiral springs may deform in any direction, this may causes the magnet module to deviate from an appropriate vibration direction. As such, stability and reliability of the linear vibrating motor is low.

Therefore, it is desired to provide a linear vibrating motor to overcome the aforesaid problems.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
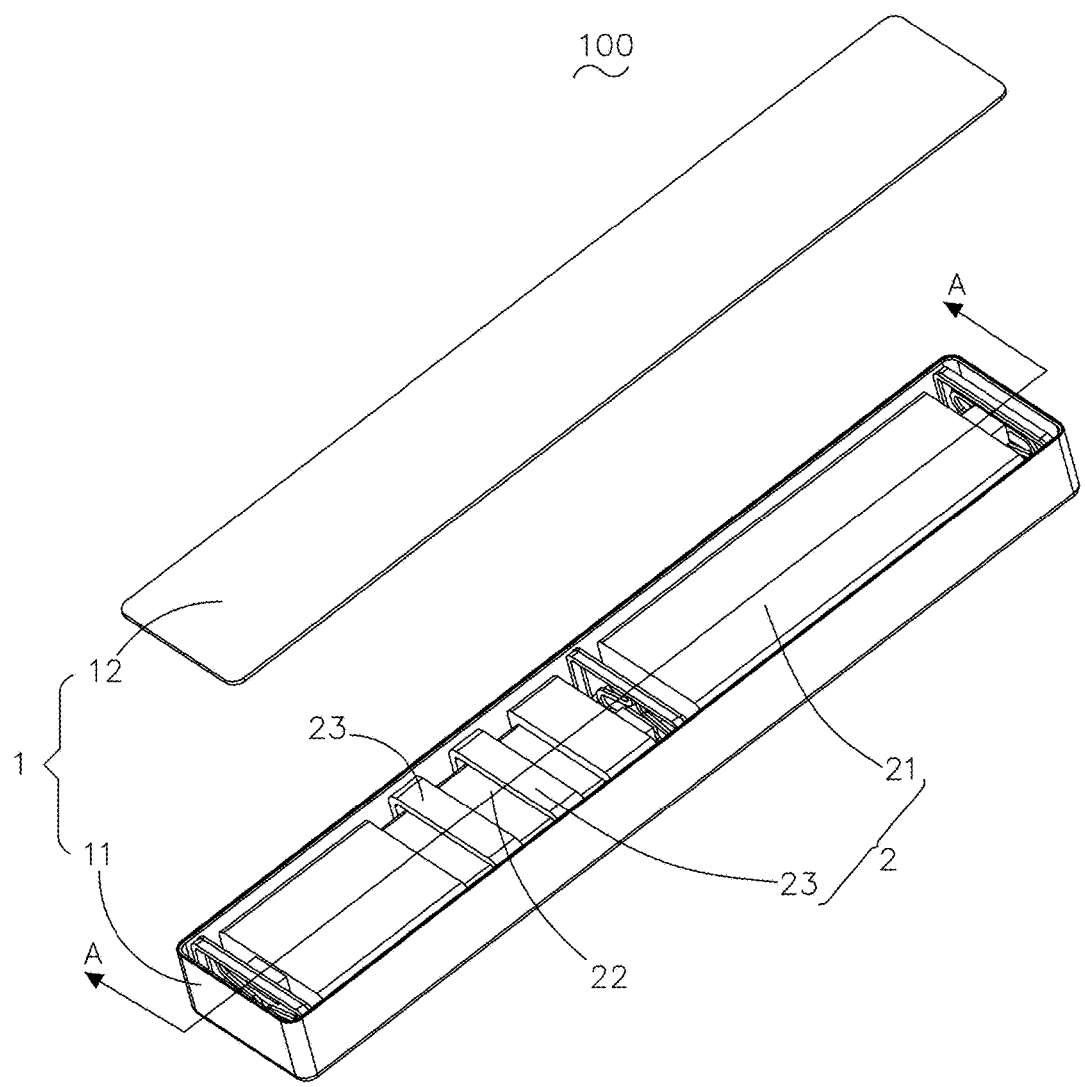
FIG. 1 is a schematic view of a linear vibrating motor according to an exemplary embodiment of the present disclosure.

The present disclosure will be described in detail below with reference to the attached drawings and embodiments thereof.

Referring to FIGS. 1-4, a linear vibrating motor 100 according to an exemplary embodiment of the present disclosure is shown. The linear vibrating motor 100 includes a shell 1 providing a receiving cavity 101, a magnetic assembly 2 received in the receiving cavity 101, an elastic module 4 for suspending the magnetic assembly 2, and a connecting module 5 for connecting the elastic module 4 with the shell 1.

The shell 1 has a box-like structure, which includes a main housing 11 supporting the magnetic assembly 2 and a cover 12 covering the main housing 11 for forming the receiving cavity 101. The main housing 10 includes a rectangular bottom 102, a pair of first sidewalls 103 perpendicularly extending from two opposite long edges of the bottom 102 respectively, and a pair of second sidewalls 104 perpendicularly extending from two opposite short edges of the bottom 102 respectively.

The magnetic assembly 2 includes a vibrating module 21 and a coil module 23 for driving the vibrating module 21 to vibrate. The vibrating module 21 includes a magnet part 22 cooperating with the coil module 23 to form a magnetic circuit in the shell 1. The linear vibrating motor 100 in the present embodiment only has a single magnetic circuit; in practice, the linear vibrating motor 100 may alternatively include two or more magnetic circuits. Preferably, the magnet part 22 includes at least one permanent magnet.

In the present embodiment, the coil module 23 is fixed to the shell 1 and surrounds the magnet part 22, and includes a pair of coils apart from each other. Because the coil module 23 surrounds the magnet part 22, a large magnetic flux can be obtained to ensure the linear vibrating motor 100 to produce a strong driving force for performing a strong vibration with a small driving current. Therefore, the linear vibrating motor 100 has low energy consumption, as well as a long lifespan.

In an alternative embodiment, the vibrating module 21 may be consisted of the magnet part 22, or may further include other components capable of performing a vibration relative to the shell 1 in the linear vibrating motor 100 during operation.

Figure 2:
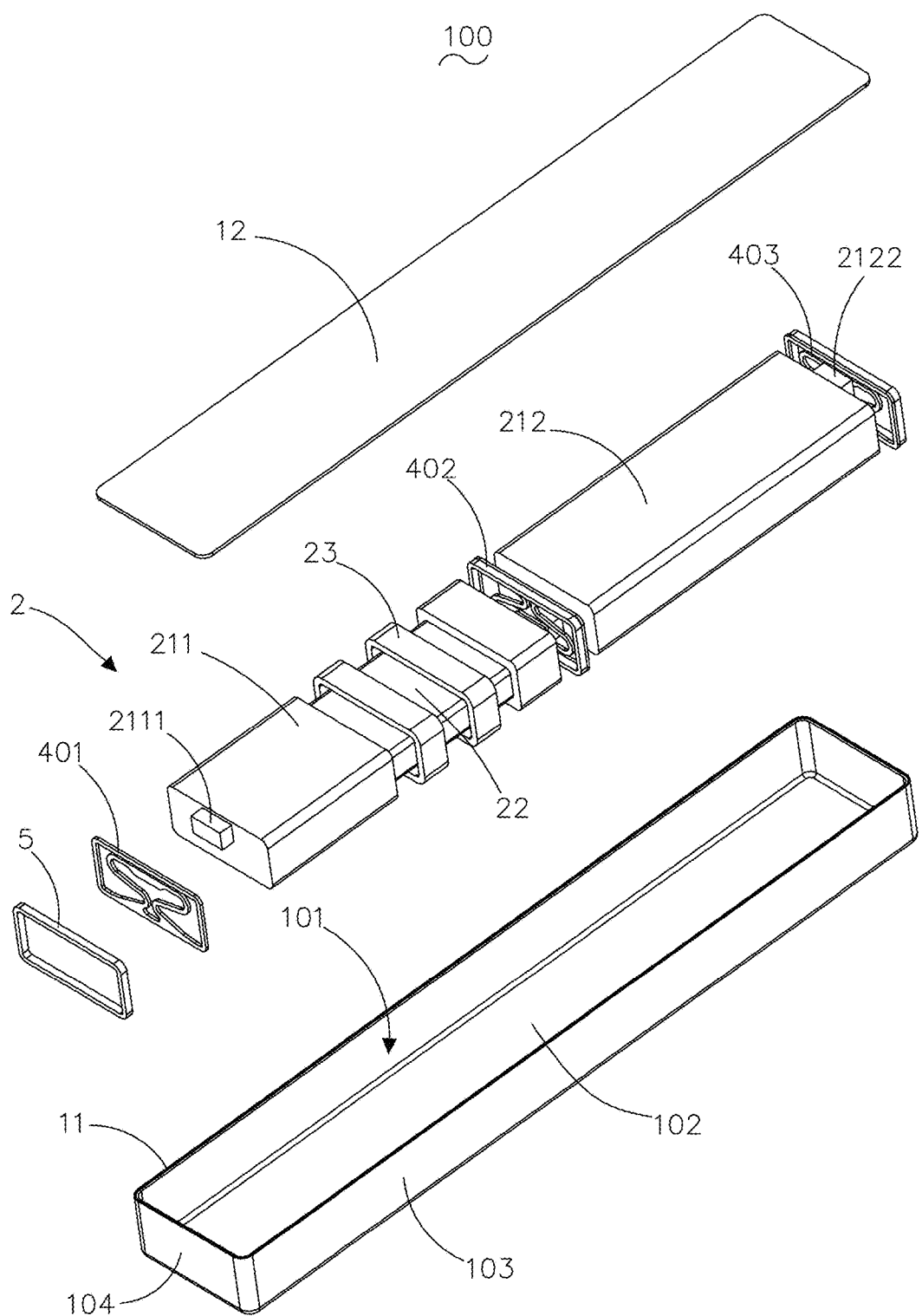
FIG. 2 is an exploded view of the linear vibrating motor in FIG. 1.
Figure 3:
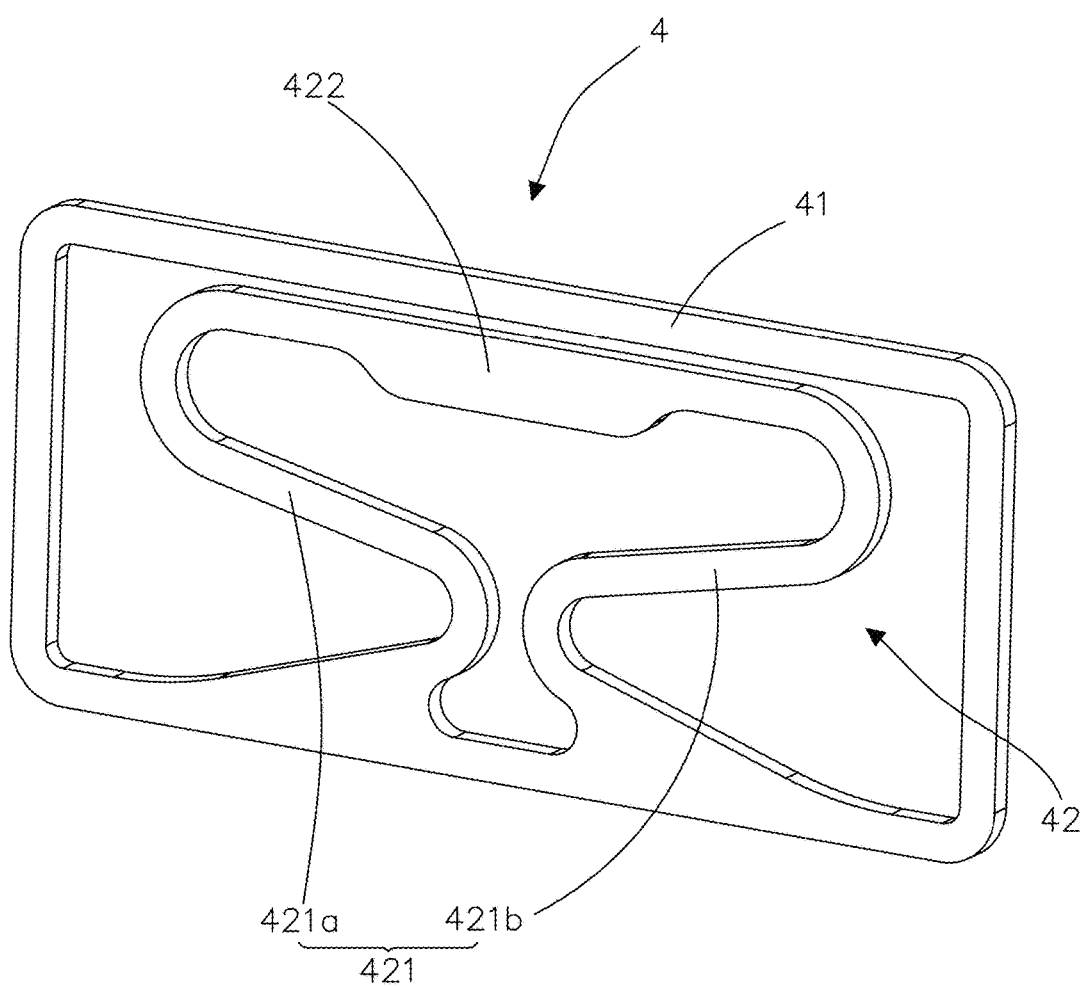
FIG. 3 is a schematic view of an elastic member of the linear vibrating motor in FIG. 1.

As illustrated in FIGS. 2-3, the vibrating module 21 as provided in the present embodiment has a two-section structure, which includes a first vibrating part 211 receiving the magnet part 22 and a second vibrating part 212 connected to the first vibrating part 211. The first vibrating part 211 includes a first protrusion 2111 and a second protrusion 2112 respectively protruding from two opposite ends of the first vibrating part 211; the second vibrating part 212 includes a third protrusion 2121 and a fourth protrusion 2122 respectively protruding from two opposite ends of the second vibrating part 212.

In the present embodiment, each of the first protrusion 2111, the second protrusion 2112, the third protrusion 2121 and the fourth protrusion 2122 has a cuboid structure to facilitate an engagement with the elastic module 4. Furthermore, a cross-section area of any of the first protrusion 2111, the second protrusion 2112, the third protrusion 2121 and the fourth protrusion 2122 is smaller than that of any other parts of the vibrating module 21. In other embodiments, the first protrusion 2111, the second protrusion 2112, the third protrusion 2121 and the fourth protrusion 2122 may have a cylindrical structure, a cone-shaped structure or any other convex structures.

The first protrusion 2111 is formed on an end of the first vibrating part 211 away from the second vibrating part 212; the fourth protrusion 2122 is formed on an end of the second vibrating part 212 away from the first vibrating part 211; and the second protrusion 2112 of the first vibrating part 211 faces the third protrusion 2121 of the second vibrating part 212. Furthermore, the first protrusion 2111 and the fourth protrusion 2122 are adjacent to the cover 12 of the shell 1 and are symmetrical to each other; the second protrusion 2112 and the third protrusion 2121 are adjacent to the bottom 102 of the main housing 11 and are symmetrical to each other; in other words, a distance from the cover 12 to both the first protrusion 2111 and the fourth protrusion 2122 is less than that to both the second protrusion 2112 and the third protrusion 2121.

The elastic module 4 includes at least three elastic members 401-403 made by performing stamping process on metal plates. Referring also to FIG. 3, each of the elastic members 401-403 of the elastic module 4 includes a fixing part 41 having a rectangular ring-shaped structure and an elastic part 42 arranged in and connected to the fixing part 41. The elastic part 42 is an elastically deformable part capable of performing elastic deformation. For example, the fixing part 41 may includes two parallel long strips and two short strips perpendicularly connected to the long strips in an end-to-end manner, the elastic part 42 extends inwards from a long strip of the fixing part 41 and surrounded by the fixing part 41. The fixing part 41 and the elastic part 42 may be integrated into a one-piece structure.

The elastic part 42 includes an elastic arm pair 421 extending from the long strip, and a connecting arm 422 connected between the elastic arm pair 421. The elastic arm pair 421 includes a first elastic arm 421a and a second elastic arm 421b symmetrical to each other about a central line of the fixing part 41; the first elastic arm 421a has a substantially S-shaped structure while the second elastic arm 421b has a substantially inverted S-shaped structure. Each of the first elastic arm 421a and the second elastic arm 421b includes an extending end extending from the long strip of the fixing part 41, and a connecting end connected to the connecting arm 422.

Figure 4:
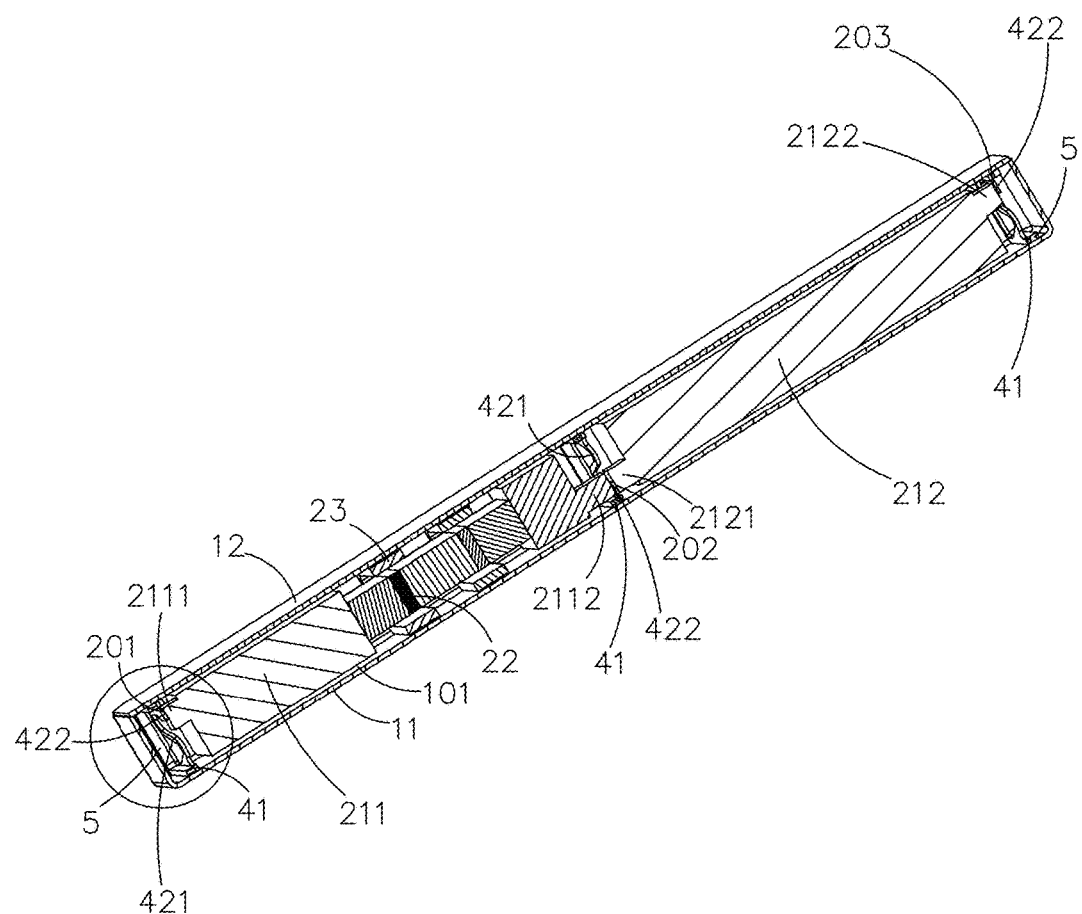
FIG. 4 is a cross-sectional view of the linear vibrating motor in FIG. 1, taken along line A-A.
Figure 5:
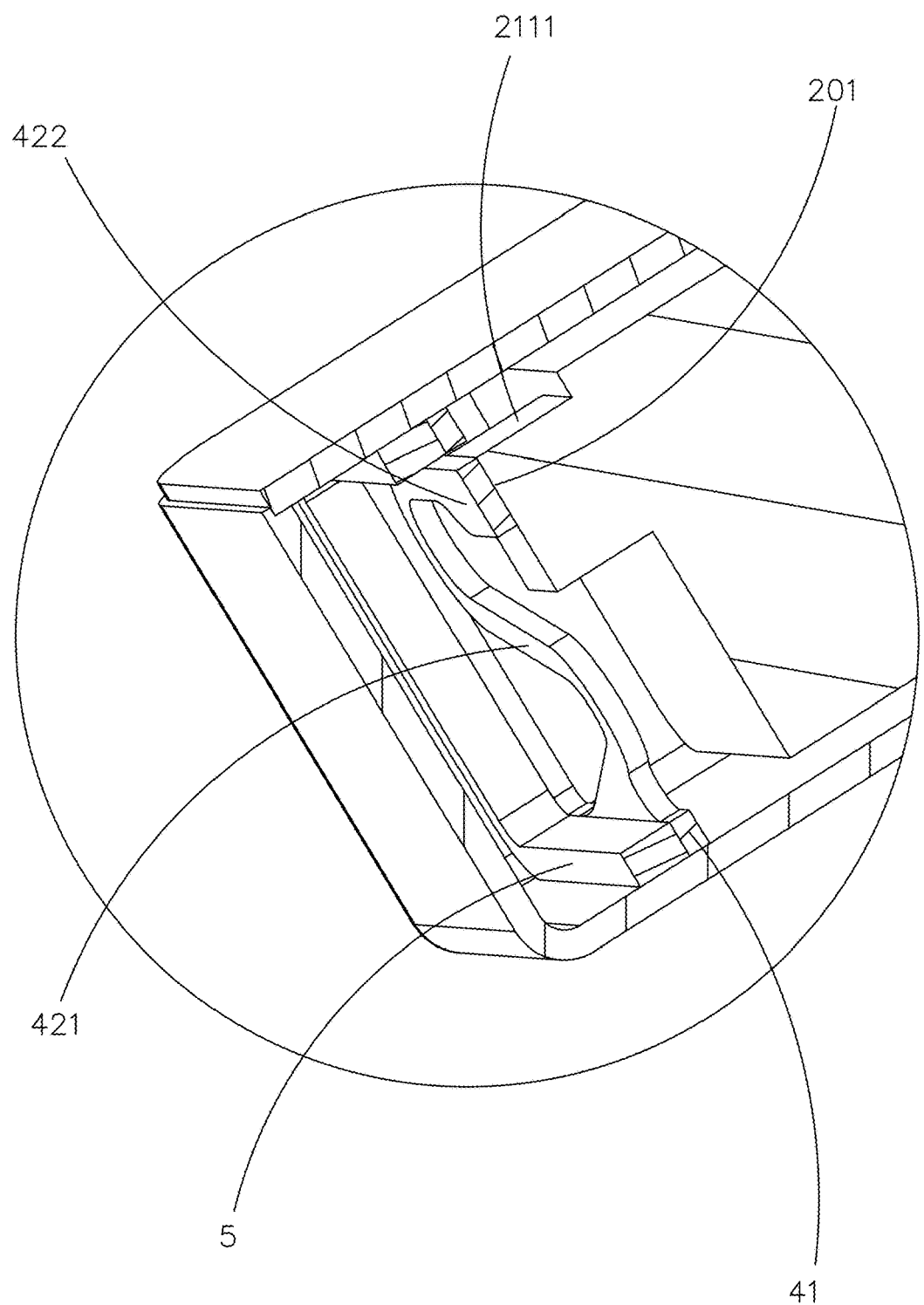
FIG. 5 is a partial, enlarged view of the linear vibrating motor in FIG. 4.

In the present embodiment as illustrated in FIGS. 1, 2, and 4, the elastic module 4 includes a first elastic member 401 connected to the first protrusion 2111, a second elastic member 402 connected between the second protrusion 2112 and the third protrusion 2121, and a third elastic member 403 connected to the fourth protrusion 2122.

Specifically, the connecting arm 422 of the first elastic member 401 is elastically connected to the first protrusion 2111 for forming a first connecting point 201; the connecting part 422 of the second elastic member 402 is elastically connected between the second protrusion 2112 and the third protrusion 2121 for forming a second connecting point 202; the connecting part 422 of the third elastic member 403 is elastically connected to the fourth protrusion 2122 for forming a third connecting point 203. Furthermore, the fixing parts 41 of the first elastic member 401, the third elastic member 403 and the second elastic member 402 are respectively connected to the shell 1 via the connecting module 5.

Due to the arrangement of the first protrusion 2111, the second protrusion 2112, the third protrusion 2121 and the fourth protrusion 2122, the first connecting point 201, the second connecting point 202 and the third connecting point 203 are arranged in a non-collinear manner. In detail, a connection line between the first connecting point 201 and the second connecting point 202 is non-parallel to the vibrating direction of the vibrating module 21; and a connection line between the third connecting point 203 and the second connecting point 202 is also non-parallel to the vibrating direction. Consequently, a contact relation between the elastic module 4 and the vibrating module 21 is surface contact rather than point contact. As such, the elastic module 4 can provide a non-linear elastic force to the vibrating module 21. With this configuration, the vibrating module 21 is restricted to vibrate in a direction perpendicular to a vibrating direction, and thereby enhance the stability and reliability of the linear vibrating motor 100.

The connecting module 5 is configured for enlarging contact areas between the shell 1 and the elastic module 4. In the present embodiment, the connecting module 5 includes three connecting members, for example, two of the connecting members are configured for connecting the fixing part 41 of the first elastic member 401 and the third elastic member 403 with the cover 12 of the shell, and the other one of the connecting members is connected between the second elastic member 402 and the bottom 102.

The first elastic member 401, the second elastic member 402 and the third elastic member 403 may have identical shapes. The second elastic member 402 is positioned inversely to the first elastic member 401 and the third elastic member 403, and thereby an extending direction of the elastic part 42 of the second elastic member 402 is opposite to that of the first elastic member 401 and the second elastic 403. Additionally, the first elastic member 401 and the third elastic member 403 are respectively connected between two opposite ends of the vibrating module 21 and the shell 1; and the second elastic member 402 is connected between a middle section of the vibrating module 21 and the shell 1.

Alternatively, the first elastic member 401, the second elastic member 402 and the third elastic member 403 may have different shapes, and the elastic module 4 may include more than three elastic members. In addition, the fixing part 41 may be an optional part, and thereby may be omitted.

Furthermore, in other embodiments, the magnet part 22 may be received in the second vibrating part 212, or the magnet part 22 may include two magnet units respectively received in the first vibrating part 211 and the second vibrating part 212.

In operation, the coil module 23 interacts with the vibrating module 21 to drive the vibrating module 21 to vibrate along the vibrating direction. During operation of the linear vibrating motor 100, the elastic parts 42 of the elastic module 4 provide an elastic force to the vibrating module 21 to prevent the vibrating module 21 from deviating from the vibrating direction.

Furthermore, the non-linear arrangement of the first elastic member 401, the second elastic member 402 and the third elastic member 403 can also improves vibration linearity of the vibrating module 21, and the vibrating module 21 can be protected from colliding with the shell 1, therefore, stability and reliability of the linear vibrating motor 100 can also improved.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A linear vibrating motor, comprising:
a shell providing a receiving cavity;
a vibrating module received in the receiving cavity for generating a linear vibration;
a coil module for driving the vibrating module to vibrate; and
an elastic module for suspending the vibrating module in the receiving cavity; wherein
the elastic module comprises a first elastic member, a second elastic member and a third elastic member connected between the vibrating module and the shell at a first connecting point, a second connecting point and a third connected point; the first connecting point, the second connecting point and the third connecting point are arranged in a non-linear manner.

2. The linear vibrating motor as described in claim 1, wherein the vibrating module comprises a first vibrating part and a second vibrating part opposite to the first vibrating part, the first vibrating part comprises a first protrusion and a second protrusion respectively protruding from two opposite ends of the first vibrating part; the second vibrating part comprises a third protrusion and a fourth protrusion respectively protruding from two opposite ends of the second vibrating part.

3. The linear vibrating motor as described in claim 2, wherein the second protrusion of the first vibrating part faces the third protrusion of the second vibrating part; the shell comprising a main housing and a cover covering the main housing, a distance from the cover to the first protrusion and the fourth protrusion is less than that to the second protrusion and the third protrusion.

4. The linear vibrating motor as described in claim 3, wherein the first elastic member is connected to the first protrusion, the second elastic member is connected between the second protrusion and the third protrusion, and the third elastic member is connected to the fourth protrusion.

5. The linear vibrating motor as described in claim 4, wherein each of the first elastic member, second elastic member and the third elastic member comprises a fixing part having a ring-shaped structure, and an elastic part extending inwards from the fixing part and surrounded by the fixing part; the fixing part is fixed to the shell, and the elastic part is connected to a corresponding one of the first protrusion, the second protrusion, the third protrusion, and the third protrusion.

6. The linear vibrating motor as described in claim 5, wherein the elastic part comprises an elastic arm pair extending from the fixing part, and a connecting arm connected between the elastic arm pair.

7. The linear vibrating motor as described in claim 6, wherein the elastic arm pair comprises a first elastic arm and a second elastic arm symmetrical to each other about a central line of the fixing part.

8. The linear vibrating motor as described in claim 7, wherein the first elastic arm has a substantially S-shaped structure, and the second elastic arm has a substantially inverted S-shaped structure.

9. The linear vibrating motor as described in claim 7, wherein an end of each of the first elastic arm and the second elastic arm extends from the fixing part, and the other end of each of the first elastic arm and the second elastic arm is connected to the connecting arm.

10. The linear vibrating motor as described in claim 5, wherein the fixing part comprises has a rectangular ring-shaped structure with two long strips and two short strips, the elastic part extends from one of the long strips.

11. The linear vibrating motor as described in claim 10, wherein the fixing part and the elastic part are integrated into a one-piece structure.

12. The linear vibrating motor as described in claim 6, wherein the connecting arm of the first elastic member is elastically connected to the first protrusion for forming the first connecting point; the connecting part of the second elastic member is elastically connected between the second protrusion and the third protrusion for forming the second connecting point; the connecting part of the third elastic member is elastically connected to the fourth protrusion for forming the third connecting point.

13. The linear vibrating motor as described in claim 1, wherein the first elastic member, the second elastic member and the third elastic member have identical shapes, and the second elastic member is positioned inversely to the first elastic member and the third elastic member.

14. The linear vibrating motor as described in claim 3, further comprising a connecting module, wherein the first elastic member, the third elastic member and the second elastic member are respectively connected to the shell via the connecting module.

15. The linear vibrating motor as described in claim 14, wherein the connecting module comprises a first connecting member and a second connecting member for connecting the first elastic member and the third elastic member with the cover, and a third connecting member for connecting the second elastic member with a bottom of the main housing.

* * * * *